3,323,670
BOTTLE CLOSURE
Frank P. Flack, Atlanta, Ga., assignor to Standard Cap & Seal, Inc., Chamblee, Fla., a corporation of Florida
Filed Sept. 9, 1964, Ser. No. 395,178
7 Claims. (Cl. 215—38)

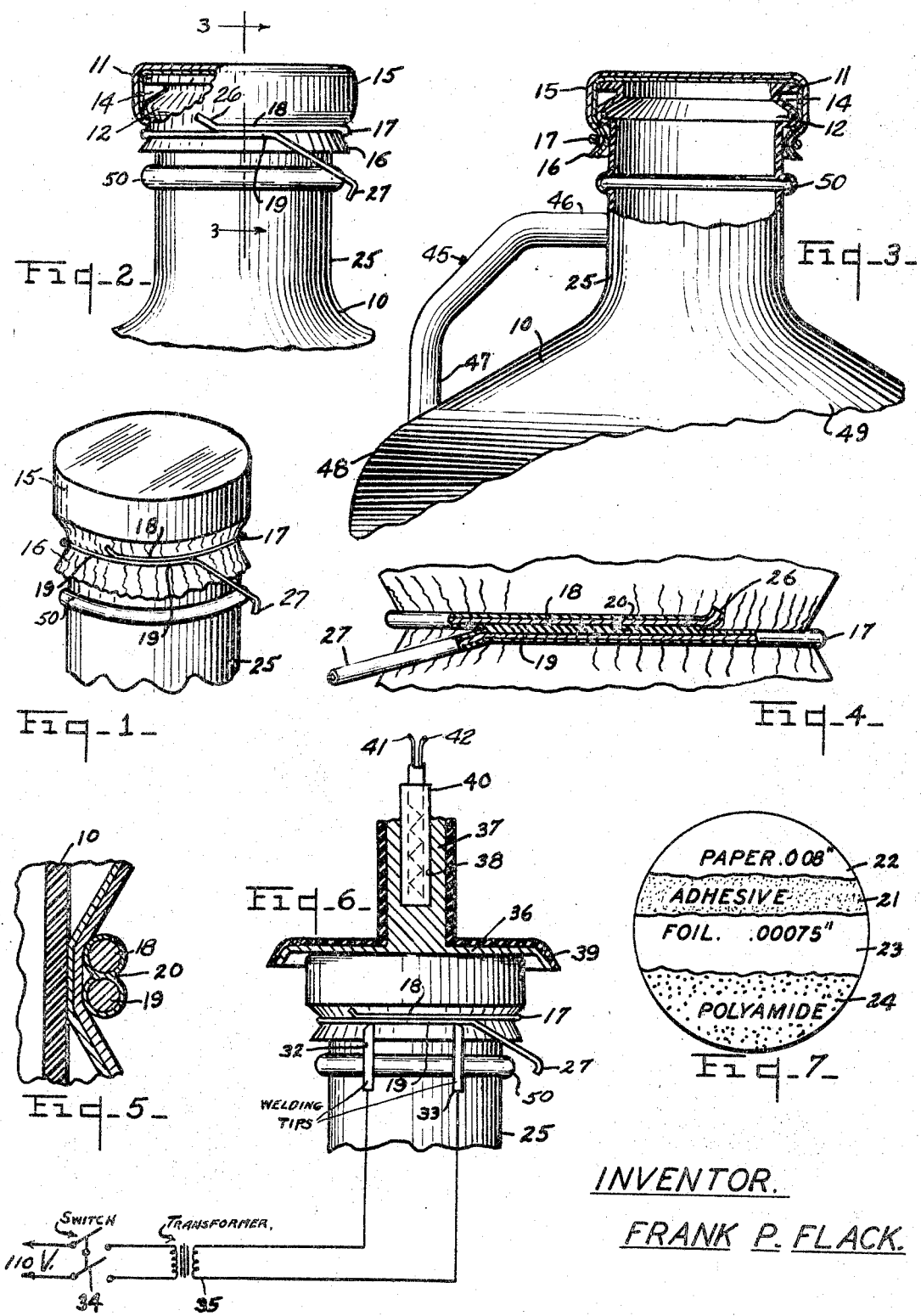

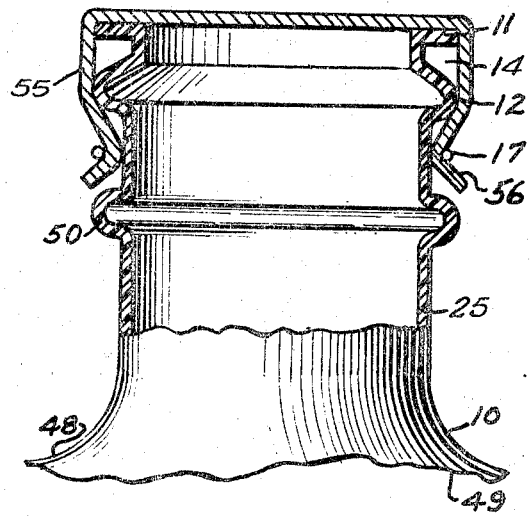
Fig-8-
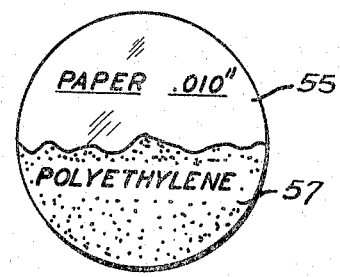
Fig-9-
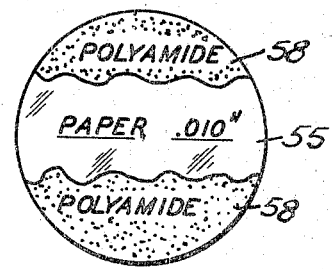
Fig-10-
INVENTOR.
FRANK P. FLACK.

This invention relates to improvements in a bottle closure and it is more particularly directed to a sanitary closure for bottles and the like and to a method of applying the same to a plastic bottle.

The method of my invention has a number of characteristics. Generally speaking, it consists in placing a novel laminated closure comprising paper and foil over the mouth of a plastic bottle and about the exterior bottle portions adjacent the bottle mouth, heating the closure immediately prior to, or after, the application thereof to the bottle mouth, applying pressure to the central disk portion of the closure while in position upon the top annular ledge of the plastic bottle, placing a metallic strand or metallic ring about the skirt of the closure, contracting the ring into tight engagement with the laminated closure by relatively moving adjacent portions oppositely and circumferentially, placing a bond between said metal ring contacting portions that is inclusive of fusible metal that will fuse in response to heat, applying sufficient heat by the application of fusing currents of electricity to the region of said ring portions and bond to cause the fusible metal to fuse, and permitting the fusible metal to harden while the ring is contracted to hold said ring contacting portions in ring contracting relation. In the method, as preferably practiced, the metal ring is of such circumferential length that the adjacent portions thereof that are oppositely and circumferentially moved to contract the ring are brought into mutually side by side lapping relation so that they may be merely torn apart when the closure is to be removed to afford access to the bottle covered by the closure. The fusible metal formed of lead and tin is desirably provided directly upon these ring portions whereby the ring, itself, is inclusive of a constituent which will fuse in response to heat. The closures are formed of a lamination of paper and foil, the metal layer is an inner or lower layer of the closure, while the thicker nonmetallic layer is an upper or outer layer. The metal layer is very thin, say .00075 inch thick, while the nonmetallic layer or top layer is a relatively thick layer of paper, say .008 inch thick, to give the necessary stiffness to the closure. The top layer is adhered to the metal bottom layer by a suitable agglutinant; the total thickness of the laminated closure may be .009 inch.

In the preferred way of practicing the method of my invention, the necessary heat is furnished by an electric current of suitable voltage and amperage, passed through a portion of the ring, the ring being preferably metallic, and also through the tin and lead coating thereon, this tin and lead coating constituting the preferred form of fusible cement that is adaptable to fuse in response to heat.

In previous methods of sealing bottles, the bottle was provided with an annular seat at the mouth of the bottle for receiving a paper closure disc, with a paper closure placed over the bottle top and closure disc and provided solely to keep foreign matter from collecting on the disc and/or preventing removal of the disc until the proper time by the user.

The bottle about which this invention relates is free of an annular seat for a closure disc and requires a skirted closure that will seal the bottle from leakage. The lower surface of the lower layer of foil is coated with F&DA approved polyamide. The bottle is a blow-molded plastic unit, made from high-density polystyrene or polyethylene to form a suitable single-use container. The approved polyamide release coating on the foil will adhere to the top surface of the annular ledge by application of pressure to a heated closure of the laminated type described above. The plastic bottle is formed with an annular bead enlargement spaced a short distance below the lip of the top annular ledge cooperating with each other and defining a channel. In the structure of my invention, the metal ring is placed below this annular bead enlargement and about the cap skirt and has mutually lapping portions that are united by a cement bond that holds these portions in ring contracting relation and permits these portions to be readily torn apart when the bottle is to be uncapped, at least one of the mutually lapping portions having an unattached end which may be grasped for this purpose. The annular bead enlargement of the bottle in the region of its mouth and below the annular lip thereof will prevent the withdrawal of the ring over the bottle mouth, and will effect the top disc portion of the closure to remain in a horizontal, tight engagement with the flat top surface of the annular lip portion at the mouth region of the bottle, the releasable polyamide acting a suitable agglutinant until the ring is broken, thereby liquid sealing the mouth portion of the bottle until time of use of the contents.

The method and structure of my invention will be more fully explained in connection with the accompanying drawing in which:

FIGURE 1 is a perspective view of a mouth and neck portion of a bottle with a laminated closure assembled and sealed thereon;

FIGURE 2 is an elevational view of the bottle and closure shown by FIGURE 1, with a fragmentary portion of the closure removed and exposing the upper ledge and bead portion of the bottle;

FIGURE 3 is sectional view taken on line 3—3 of FIGURE 1, the fragmentary portion of the bottle showing a plastic handle formed therewith;

FIGURE 4 is an enlarged front view of a portion of the bottle in the zone of the ring, the mutually lapping portions of the ring being shown in section in order to illustrate the tin and lead coatings thereon;

FIGURE 5 is an enlarged view of a portion of the bottle as it appears in FIGURE 3;

FIGURE 6 is a diagram illustrating a circuit arrangement whereby the cement coating upon the mutually lapping portions of the ring may be heated to flux the same for the purpose of uniting these mutually lapping ring portions while they are in ring contracting relation;

FIGURE 7 is a diagrammatic plan view of a central portion and skirt portion of a closure in the same plane and with the layers of material progressively broken away;

FIGURE 8 is a sectional view similar to FIGURE 3, showing a closure sealed upon a bottle mouth portion of a bottle, the closure preferably made of a comparatively stiff paper and its lower surface having a polyethylene coating thereon;

FIGURE 9 is a diagrammatic plan view of the closure shown in FIGURE 8, in a flat plane, and with the top layer of paper broken away showing the polyethylene coating; and FIGURE 10 is a diagrammatic plan view of the central portion and skirt portion of a closure in the same plane and with the layers of material progressively broken away, showing the paper layer with a polyamide coating on each side thereof.

The bottle 10, illustrated, is a novel plastic bottle which is employed for containing milk or cream, commonly known as a blow-molded plastic milk bottle, or a one-trip all-plastic container, usually blown-polyethylene. Whether blown or formed, high-density polyethylene bottles are in greatest use now in the dairies, with sizes of one gallon, half-gallons, quarts and pints. This type plastic bottle has an external horizontal lip 11 adjacent the mouth thereof and has an annular enlargement or bead 12 arranged at a short distance below said lip 11 and defining an annular channel 14 between said lip and said bead. The external diameter of said lip 11 and said bead 12 are substantially the same, allowing the skirt portion 16 of the closure 15 to extend vertically downward, allowing the skirt to be pressed inwardly against the neck of the bottle below the bead 12 by a ring 17, this ring being metallic wire having mutually lapping circumferentially extending portions 18 and 19. A fusible metal bond 20 is disposed between said mutually lapping and circumferentially extending ring portions and serves to hold these portions in assembly, the bond being brought into its holding relation after the ring portions 18 and 19 have been drawn circumferentially and in opposite directions with sufficient force to tightly hold the closure skirt 16 against the neck of the bottle 10.

The closure employed is preferably of a laminated construction formed of paper and foil, the closure comprising a top layer of paper approximately .008 inch thick superposed with a bottom layer of aluminum foil approximately .00075 inch thick bonded together by a suitable adhesive. The closure as shown has an inner layer of adhesive 21, applied to the under surface of a layer of paper 22 and covered by the layer of aluminum foil 23. It will be seen that the lamination comprised in the closure are bonded together by adhesive in a manner to form an integral or one-piece closure. The layer of paper 22 being non-porous and impervious to moisture, cooperates with the layer of foil 23 and the adhesive 21 to make a reliable and satisfactory, substantially rigid closure. The lower layer of foil 23 is coated with F&DA approved polyamide 24, forming an approved polyamide release coating on the foil which will adhere to the top surface of the annular ledge by the application of pressure to a closure which has been subjected to heat. The polyamide on the foil forms a pressure-sensitive releasably adhesive which will adhere to polyethylene, and in this case cause the foil to seal itself liquid tight to the top ledge of the bottle and remain sealed tightly until the ring 17 is broken and removed from the closure and the bottle.

The laminated closure 15 employed permits the ring 17 to be tightly placed into its skirt 16 whereby the closure may have effective and sealing engagement with the bottle lip 11 and bead 12 or the neck portion 25 thereof. The ring 17 terminated in free ends portions 26 and 27; the end portion 27 is desirably sufficiently long so that it may be grasped by the thumb and finger when the ring is to be broken. The two ring portions are desirably so related that one portion, say the portion 26, is above the other so that both may take part in gripping the closure without imposing undue strain upon the cement bond 20 between the mutually lapping ring portions.

The ring 17 is a metal wire tinned with lead, the tin and lead coating of the wire ring fluxing under a degree of heat. The heat for fusing the tin and lead coating upon the mutually lapping portions of the ring may be furnished by a transformer 35 of primary voltage suitable to input voltage, preferably used with 110 volt electric lines, the transformer in turn supplying suitable transformed secondary current of low voltage to the welding fingers, the function and operation of which will be described in consideration with FIGURE 6 of the drawing. The terminals, or welding fingers 32 and 33 of the electric circuit are preferably applied to the ring in a manner to include both mutually lapping ring portions 18 and 19 directly therebetween. When the necessary fusing has been effected, the fingers 32 and 33 may be removed, or the circuit may be opened by the master switch 34, if desired. The closure heating plate 36 is integrally formed with a shaft 37 with a central longitudinal bore 38 wherein the heating element 40 is housed and insulated from the shaft; said heating element being connected with electrical conductors 41 and 42 extending to switches of the universal type not shown. The shaft 37 and plate 36 being covered by a rubber cover means 39 to protect the operator of the automatic machine not shown. The heating plate 36 warms the polyamide on the lower surface of the foil 23, and the plate also applies pressure to the closure causing the polyamide to adhere to the top ledge of the bottle, said polyamide forming a release type adhesive with the polyethylene bottle. The plastic bottle 10 formed with uniform thickness of the walls thereof is provided with a solid plasic handle 45 secured a one end 46 to the bottle neck 25 and the opposite and lower end 47 to the top surface 48 of the body 49 of the bottle. The neck portion 25 of the bottle is provided with another annular bead 50 arranged substantially mid-way between the body 49 of the bottle 10 and the lip 11, giving added strength to the neck 25 and also for use in case an extremely long skirted closure should be deemed advisable to seal the mouth of the bottle; the seal being tamper-proof.

As shown by FIGURE 8, the closure 55 is preferably made of relatively stiff paper placed over the mouth of the bottle 10, this closure having a skirt 56 integral therewith which is encircled by a ring of wire 17. It is often desirable to provide a single layer of paper without any foil or the like secured thereto. As shown by FIGURE 9, the closure prior to forming is flat and the lower surface thereof is provided with a coating of polyethylene 57. As shown by FIGURE 10 the closure is provided with a polyamide coating 58 upon both the upper and lower surface thereof.

It is clearly seen that the closures disclosed by the drawings in all the views have the desired releasable type coating which will attach itself by heat and pressure to the top ledge of the bottle mouth, providing a leak-proof closure.

The heat applied to the end portions of the wire 17 to fuse the metal bond 20 may soften the polyamide coating on the inner surface of the closure directly behind the bond area and the pressure of the wire about the closure provides the necessary pressure to press the skirt into tight engagement with the neck portion of the plastic bottle; this action provides a temporary annular auxiliary seal between the closure and the bottle neck which is easily and quickly broken to release the closure from the bottle neck.

It will be observed that the method of my invention is a material improvement upon the prior methods employed for contracting closures holding rings about the skirts of closures made solely of paper such as disclosed in Patent No. 1,635,510, dated 1927.

I do not wish to be limited to the method and apparatus herein disclosed for producing a closure which will become a release type seal with a polyethylene bottle. It is obvious that changes may be made without departing from the invention.

I claim:

1. A protective member comprising a seamless laminated paper and foil closure having depending pleated skirt type side walls thereof, the foil forming the inner lower layer of the closure and coated with a polyamide, the polyamide being relatively tacky when heated and characterized by the quality of being adherent to similar surfaces but not to dissimilar uncoated surfaces, whereby a releasable liquid tight joint is formed between the polyamide coated foil type laminated closure and the mouth portion of a plastic bottle when the closure is pressed into engagement with the plastic mouth portion of the plastic bottle and retained there by a wire ring encircling the skirt portion thereof and having its end portions releasably sealed together.

2. A laminated sheet material hood type closure for plastic container heads comprising an upper layer of paper and a lower layer of foil having its interior exposed surface having a polyamide coating thereon, the annular skirt being longitudinally creased to render the same radially contractible and expandable, said polyamide coating capable of being rendered tacky by heat for sealing the central portion of the closure to the mouth portion of a plastic bottle when applied thereover and with pressure applied thereto, the pressure and seal maintained by placing a metallic ring about the closure skirt and bottle neck and which ring has adjacent end portions capable of fluxing when subjected to heat, and capable of cooling and holding said ring portions in ring contracting relation.

3. A closure for closing and sealing a plastic bottle, comprising superposed laminations including an inner layer of metal foil, a superposed lamination of kraft paper and bonded thereto by a layer of adhesive material, the lower exposed surface of said foil having a polyamide coating thereon which is capable of being rendered tacky by heat for releasably sealing the central portion of the closure to the mouth portion of a plastic bottle when pressure is applied thereto, a liquid proof seal being maintained between the closure and the bottle by placing a metallic ring about the closure skirt and bottle neck, fluxing the adjacent portions of the ring and holding said ring portions in ring contracting relation.

4. A tamper-proof combination of plastic bottle finish and closure comprising a plastic bottle neck having an annular peripheral ledge adjoining the mouth, an annular peripheral bead beneath the ledge, a narrow annular groove separating said ledge and bead, and an external closure, said closure having a deformable skirt portion disposed under said bead and forced tightly against the neck of the bottle by a wire ring, said closure having a polyethylene coating upon the interior surface thereof capable of becoming tacky by heat and sealing to plastic surfaces under pressure, said ring having end portions bonded together about said skirt and bottle neck to prevent removal of said closure and breaking of said plastic seal between said polyethylene coated closure and said bottle mouth.

5. A tamper-proof combination of plastic bottle finish and a laminated closure comprising a bottle neck having an annular peripheral ledge adjoining the mouth, an annular peripheral bead beneath the ledge, a narrow annular groove separating said ledge and bead, and an external laminated closure, said closure having a top layer of paper and a lower layer of foil bonded thereto, the lower free surface of said foil coated with a polyamide, said closure having a relatively long deformable skirt continuously disposed under said bead and extending across said groove with the bottom of the skirt forced tightly against the lower portion of said bead and the bottle neck adjacent thereto by a metal ring tightly contracted about the skirt of the closure forcing the central circular portion of said closure tightly against the top surface of said ledge whereby said polyamide coating releasably adheres to said ledge, said ring having mutually lapping portions extending circumferentially of the ring and provided with metal cement coatings upon their adjacent faces, prior to the application of the ring to the cap skirt, and which cement coatings flux in response to heat, and these coatings being fluxed together to form a cement bond between said ring portions.

6. In a sealed plastic container having a mouth ledge and neck bead and an external laminated closure, said closure comprising a top layer of paper, a lower layer of foil bonded to said layer of paper, said layer of foil being coated with a polyamide coating, said closure having a central portion and a skirt portion, said central portion adapted to extend across the mouth of the plastic container and said skirt portion adapted to extend below said bead and around the container neck, said foil coated portion adapted to seal to plastic surfaces when the coating is heated and pressed thereon, a narrow groove separating said bead and ledge, said skirt portion forced tightly against the lower surface of said bead and against said neck by a metal wire ring tightly contracted about the skirt of the closure and pulling downwardly on the closure forcing the central circular portion of the closure tightly against the top surface of said ledge whereby said polyamide coating releasably adheres to said ledge, and the continuous annular bead extending outwardly from the container neck preventing the closure to be moved upwardly thereby producing a tamper-proof container.

7. A polyethylene bottle whose neck is externally enlarged at the mouth of the bottle, in combination with a skirted laminated cap placed over the mouth of the bottle and about the bottle neck, said cap embodying an outer layer of paper and an inner layer of aluminum foil, the exposed surface of said aluminum foil having a fusible coating polyamide applied thereto, said cap heat sealed to the top surface of the bead of the bottle, and a metal ring tightly contracted about the skirt of the cap and bottle neck having mutually lapping portions extending circumferentially of the ring and provided with cement coatings upon their adjacent faces, prior to the application of the ring to the cap skirt, and which cement coatings flux in response to heat, these coatings being fluxed together to form a cement bond between said ring portions, said ring being below the enlargement of the mouth of the bottle.

References Cited
UNITED STATES PATENTS

| | | | |
|---|---|---|---|
| 1,150,823 | 8/1915 | Janisch | 215—38 |
| 2,634,013 | 4/1953 | Atwood | 215—38 |
| 2,937,481 | 5/1960 | Palmer | 215—37 |
| 2,967,161 | 1/1961 | Hart. | |

JOSEPH R. LE CLAIR, *Primary Examiner.*

R. PESCHOCK, *Assistant Examiner.*